(12) United States Patent
Agell Merino et al.

(10) Patent No.: US 9,085,282 B2
(45) Date of Patent: Jul. 21, 2015

(54) HINGE DEVICE FOR THE ARTICULATED ATTACHMENT OF A HOOD TO A VEHICLE CHASSIS

(71) Applicant: Flexngate Automotive Iberica, S.L.U., Les Franqueses del Valles (ES)

(72) Inventors: Aitor Agell Merino, Terrassa (ES); Assia Petrova Borislavova, Montcada i Reixac (ES); Alberto Cano Sainz, Sant Pere de Ribes (ES); Miguel Angel Sells Hidalgo, Barcelona (ES)

(73) Assignee: FLEXNGATE AUTOMOTIVE IBERICA, S.L.U., Les Franqueses Del Valles (ES)

( * ) Notice: Subject to any disclaimer, the term of this patent is extended or adjusted under 35 U.S.C. 154(b) by 0 days.

(21) Appl. No.: 14/296,021

(22) Filed: Jun. 4, 2014

(65) Prior Publication Data
US 2014/0359974 A1    Dec. 11, 2014

(30) Foreign Application Priority Data

Jun. 5, 2013   (ES) .................................. 201330832

(51) Int. Cl.
*B60R 21/38* (2011.01)
*E05D 11/00* (2006.01)
*E05D 11/10* (2006.01)

(52) U.S. Cl.
CPC ............... *B60R 21/38* (2013.01); *E05D 11/00* (2013.01); *E05D 11/10* (2013.01); *E05D 2011/009* (2013.01); *Y10T 16/54* (2015.01)

(58) Field of Classification Search
CPC ... B60R 21/38; E05D 11/00; E05D 2011/009; E05D 11/10
USPC ........................................................ 180/274
See application file for complete search history.

(56) References Cited

U.S. PATENT DOCUMENTS 8,408,593 B2 * 4/2013 Kuhlmann .................... 280/732
2014/0359974 A1 * 12/2014 Agell Merino et al. ......... 16/319

FOREIGN PATENT DOCUMENTS

| DE | 202005014611 U1 | 2/2007 |
| DE | 102005054494 A1 | 5/2007 |

(Continued)

OTHER PUBLICATIONS

Communication dated Oct. 2, 2014, issued by the European Patent Office in counterpart Application No. 14382206.

(Continued)

*Primary Examiner* — Karen Beck
(74) *Attorney, Agent, or Firm* — Sughrue Mion, PLLC

(57) ABSTRACT

The present invention relates to a hinge device for the articulated attachment of a hood to a vehicle chassis, the device comprising a lower bar and an upper bar attached to one another in an articulated manner; a retaining mechanism which, in a retaining position (R), maintains the angle α formed by the lower and upper bars and fastens the assembly formed by said bars to a support body such that the device adopts a compact shape; and an actuator capable of moving the retaining mechanism to a release position (L), disabling the function of the mentioned retaining mechanism, the device being prepared for adopting at least two different collapsed shapes (A and B) without the actuator moving the retaining mechanism to its release position (L) depending on the location of the resultant of a vertical downward force (F) transmitted to the upper bar of the device, caused by hitting a pedestrian, for example.

18 Claims, 5 Drawing Sheets

(56) References Cited

FOREIGN PATENT DOCUMENTS

| | | | |
|---|---|---|---|
| EP | 2364886 | A1 | 9/2011 |
| EP | 2364887 | A1 | 9/2011 |
| EP | 2634048 | A1 | 9/2013 |
| ES | 2386182 | A1 | 8/2012 |
| ES | 2421856 | A2 | 9/2013 |
| ES | EP 2810832 | * 12/2014 | .............. B60R 21/38 |

OTHER PUBLICATIONS

Communication dated Jan. 22, 2015, issued by the Spanish Office of Patent and Trademark in corresponding application No. 201330832.

* cited by examiner

HINGE DEVICE FOR THE ARTICULATED ATTACHMENT OF A HOOD TO A VEHICLE CHASSIS

CROSS REFERENCE TO RELATED APPLICATIONS

This is a U.S. Patent Application claiming priority based on Spanish Patent Application No. P 201330832 filed Jun. 5, 2013, the content of all of which is incorporated herein by reference in its entirety.

TECHNICAL FIELD OF THE INVENTION

The invention relates to a hinge device for the articulated attachment of a hood to a vehicle chassis of the type comprising an articulated structure supporting the rotating shaft about which the hood rotates in normal conditions of use of the device, i.e., during opening and closing maneuvers, the device being capable of lifting the mentioned rotating shaft in the event of hitting a pedestrian in order to lift the hood instantaneously for the purpose of absorbing the impact that pedestrians may experience when hitting against elements of the vehicle arranged under the hood.

BACKGROUND OF THE INVENTION

Different proposals for single-axis hinge devices prepared to allow lifting the hood in the event of hitting a pedestrian are known today. In the scope of the invention, single-axis hinges refer to hinges in which the hood is connected to the hinge device in an articulated manner about a single rotating shaft. These devices differ from other hinge proposals in which the movement of the hood is connected to the device by means of a type of articulated parallelogram, such that the hood follows a compound motion during maneuvers for closing or opening it.

Some single-axis hinge devices comprise articulated structures that allow lifting the rotating shaft of the hood in the event of hitting a pedestrian. There are known proposals using pyrotechnic devices triggered based on a signal generated by detectors which detect hitting a pedestrian and exert a thrust force on a component of the articulated structure, causing it to change from a compact shape to an extended shape, lifting the rotating shaft of the hood from the position it adopted in the compact shape. Logically, these devices have means for assuring that the device adopts the compact shape during normal operation, i.e., as long as an accident triggering the pyrotechnic device does not occur. Furthermore, for safety reasons, the articulated structure is prevented from moving in a direction that may cause the lowering of the rotating shaft of the hood.

The means which detect hitting a pedestrian and generate the trigger signal for triggering the pyrotechnic device are calibrated so that said signal is generated when a pedestrian is hit within pre-established speed ranges that may be indicated by different safety regulations with a minimum speed threshold value. At present, this means that the trigger signal is not produced if the vehicle speed is less than a value that varies between 20 and 25 km/h according to manufacturers. In these circumstances, the hinge device does not provide any active or passive response in the event of hitting a pedestrian, pedestrians being subject to the deformation that the metal plate of the hood may experience in the impact area. Nevertheless, this deformation is heavily conditioned by the points where the hood is anchored or secured to the vehicle, and said points are not disabled in the event of hitting a pedestrian at a speed below the aforementioned minimum threshold value and are formed by the articulated attachments with the hinge devices in the rear part of the hood and with the locking device of the hood in the front part thereof.

An objective of the invention is a hinge device capable of responding in the event of a situation of hitting a pedestrian when no signal whatsoever triggering the pyrotechnic device is generated, for example, when a pedestrian is hit at low speeds.

Another objective of the invention is a hinge device allowing controlled movement and deformation of the hood in the event of hitting a pedestrian and when the pyrotechnic device or equivalent element is not actuated.

Another objective of the invention is a hinge device the behavior of which varies depending on the location of the impact on the hood.

It is of interest that this hinge device is compatible with hood systems using pneumatic pistons for cooperating in the operations of opening the hood which tend to arrange the hood in an open position.

A hinge complying with the described objectives while at the same time being constructively simple and easy to adjust is also of interest.

DISCLOSURE OF THE INVENTION

The device of the invention comprises a support body intended for being firmly secured to the vehicle chassis; a lower bar rotatably attached to the support body through a lower articulation; an upper bar supporting the rotating shaft about which the hood rotates in normal conditions of use which is rotatably attached to the lower bar through an intermediate articulation; a retaining mechanism which, in a retaining position (R), maintains the angle $\alpha$ formed by the lower and upper bars and fastens the assembly formed by said bars to the support body such that the device adopts a compact shape; and an actuator capable of moving the retaining mechanism to a release position (L), disabling the function of the mentioned retaining mechanism and causing the angle formed by the lower and upper bars to increase and the device to accordingly adopt an extended shape, lifting the rotating shaft of the hood.

This device is essentially characterized in that it is prepared for adopting at least two different collapsed shapes (A and B) without the actuator moving the retaining mechanism to its release position (L), one collapsed shape (A) due to the rotation of the upper bar about the intermediate articulation and the other collapsed shape (B) due to the rotation of the lower bar about the lower articulation, depending on the location of the resultant of a vertical downward force (F) transmitted to the upper bar of the device, caused by hitting a pedestrian, for example.

In one embodiment, the device is capable of adopting collapsed shape (B) by overcoming the reaction force of abutment means opposing the rotation of the lower bar about the lower articulated attachment, or due to the movement, deformation or breaking of a part or component of the lower bar itself resting on the mentioned abutment means.

In one variant of this embodiment, the abutment means are prepared so that the reaction force opposing the rotation of the lower bar can be regulated at a pre-established value.

In one embodiment, the device is capable of adopting collapsed shape (A) by overcoming the reaction force of the retaining mechanism opposing the rotation of the upper bar about the intermediate articulated attachment in the angle $\alpha$-reducing direction, or due to the movement, deformation or breaking of a part or component of the upper bar, the lower bar or the support body that is in contact with the retaining mechanism in its retaining position (R).

In one variant, the device is capable of adopting collapsed shape (A) due to the deformation of a component or part of the retaining mechanism maintaining the angle α formed by the lower and upper bars.

According to one embodiment, the device is capable of adopting a third collapsed shape resulting from a compound motion due to the rotation of the lower bar about the lower articulation and of the upper bar about the intermediate articulation.

According to one embodiment, the retaining mechanism is formed by a bell crank lever the fulcrum of which is rotatably attached to the lower bar in an attachment arranged between the lower articulation and the intermediate articulation connecting it with the support body and the upper bar, respectively, the effort arm of the lever being connected to the actuator and the resistance arm being provided with means for holding the upper bar.

In one variant, the device is capable of adopting collapsed shape (A) due to the breaking or movement of the attachment between the lever and the lower bar.

In one variant, the effort arm of the lever is provided with a groove in which a protuberance integral with the lower bar is housed.

In one variant, the lever is provided with auxiliary means for holding the support body with play.

In one embodiment, the support body is provided with a runner along which there slides an element formed in or attached to an extension of the upper bar driving said upper bar when the device changes from an extended shape to a compact shape.

In one variant, the runner is provided with a first end branch in which the element is introduced when the device tends towards adopting collapsed shape (A).

Alternatively or simultaneously, the runner is provided with a second end branch in which the element is introduced when the device tends towards adopting collapsed shape (B).

In one embodiment, the lower bar, the upper bar or both are configured about the intermediate articulated attachment to prevent the angle α from exceeding a predetermined maximum value due to contact between the bars when the device attains an extended shape.

In one embodiment, the lower bar and the support body are configured about the lower articulation to stop the rotation of the lower bar due to contact between both when the device changes from a compact shape to adopt an extended shape.

In one variant, the device comprises a support bar for supporting the hood rotatably mounted about the rotating shaft, this support bar for supporting the hood and the upper bar being configured to prevent the rotation of the support bar for supporting the hood in the direction for closing the hood due to contact between both.

DETAILED DESCRIPTION OF THE INVENTION

Figure 1:
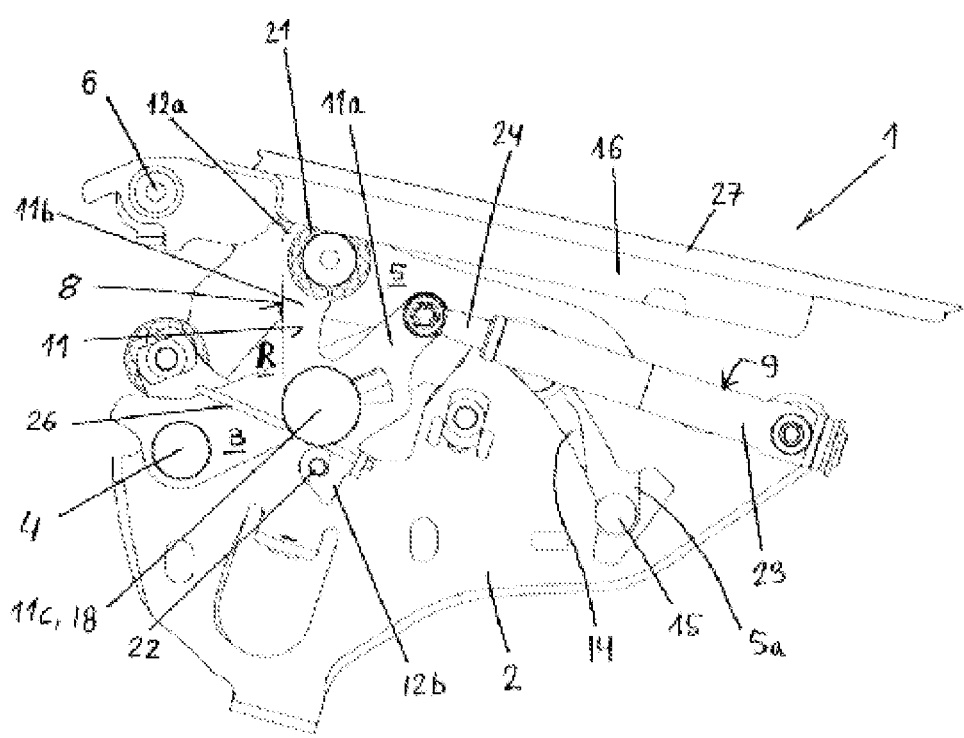
FIG. 1 is a side view of a hinge device according to an embodiment of the invention in a compact position.

FIG. 1 shows a hinge device 1 for the articulated attachment of a hood 27 to a vehicle chassis (not depicted) comprising a support body 2 intended for being firmly secured to the mentioned chassis, a lower bar 3 rotatably attached to the support body 2 through a lower articulation 4 and an upper bar 5 supporting the rotating shaft 6 about which the hood 27 rotates in normal conditions of use of the hinge 1. In the example, the hood 27 is firmly attached to a support bar 16 for supporting the hood coupled to the device 1 with capacity for rotating about the rotating shaft 6.

The upper bar 5 is rotatably attached to the lower bar 3 through an intermediate articulation 7 and the device 1 further comprises a retaining mechanism 8 which, in the retaining position R illustrated in FIG. 1, maintains the angle α (see FIG. 6) formed by the lower and upper bars 3, 5 and fastens the assembly formed by said bars to the support body 2 such that the device 1 adopts a rigid compact shape, allowing the rotation of the hood 27 about the rotating shaft 6 when the hood is to be opened or closed.

In the example, this retaining mechanism 8 is formed by a bell crank lever 11 the fulcrum 11c of which is rotatably attached to the lower bar 3 in an attachment 18 arranged between the lower articulation 4 and the intermediate articulation 7 connecting said lower bar 3 with the support body 2 and the upper bar 5, respectively, the resistance arm 11b of the lever 11 being provided with means 12a for holding the upper bar 5, which can be configured like a hook. In the example, the lever 11 is also provided with auxiliary means 12b for holding the support body 2 that can have different configurations but are shown in this case also in the form of a hook.

The upper bar 5 and the support body 2 are provided with elements for cooperating with the aforementioned hooks to immobilize the device 1 when the retaining mechanism 8 is in the retaining position R illustrated in FIG. 1. In the example, the upper bar 5 and the support body 2 are provided with respective buttons or keys 21 and 22 such that the lever 11 engages the support body 2 and the upper bar 5.

Elastic means tend towards arranging the retaining mechanism 8 in the retaining position R. In the illustrated embodiment, the elastic means comprise an elastic part 26 acting under traction between the lever 11 and the lower bar 3. In other non-depicted variants, the use of an elastic part acting between the lever 11 and the support body 2 is contemplated.

It must be noted that the auxiliary means 12b for holding the support body 2 are configured such that they link the lever 11 and upper body 2, preventing the upward movement of the lever 11, and hence of the lower bar 3 to which the lever 11 is attached, with respect to the support body 2 but not a rotational movement of lever 11 in the counterclockwise direction, i.e., in the direction towards release position L as will be described below.

The device 1 further comprises an actuator 9 formed by an electromechanical transducer, such as a pyrotechnic device for example, with the capacity of generating a mechanical impulse in response to an electrical signal. In the example, this actuator 9, shown only in FIG. 1, is formed by a plunger-piston unit of the type in which the piston 23 is connected with the possibility of rotating around a fixed point, in this case a point of the support body 2, and the plunger 24 is connected with the possibility of rotating the effort arm 11a of the lever 11. In a non-depicted variant, the plunger 24 is connected to the resistance arm 11b of the lever 11.

The effort arm 11a of the lever 11 and the lower bar 3 are prepared so that a thrust made on the effort arm can be mechanically transmitted to the lower bar 3 to cause the movement thereof. In the example, the effort arm 11a of the lever 11 is provided with a groove 13 in which a protuberance 25 integral with the lower bar 3 is housed.

In other variants, providing the effort arm 11a of the lever 11 and the lower bar 3 with respective flanges, protuberances or added parts abutting and cooperating with one another is envisaged so that the movement of the effort arm 11a of the lever can drive in its movement the lower bar 3.

Figure 2:
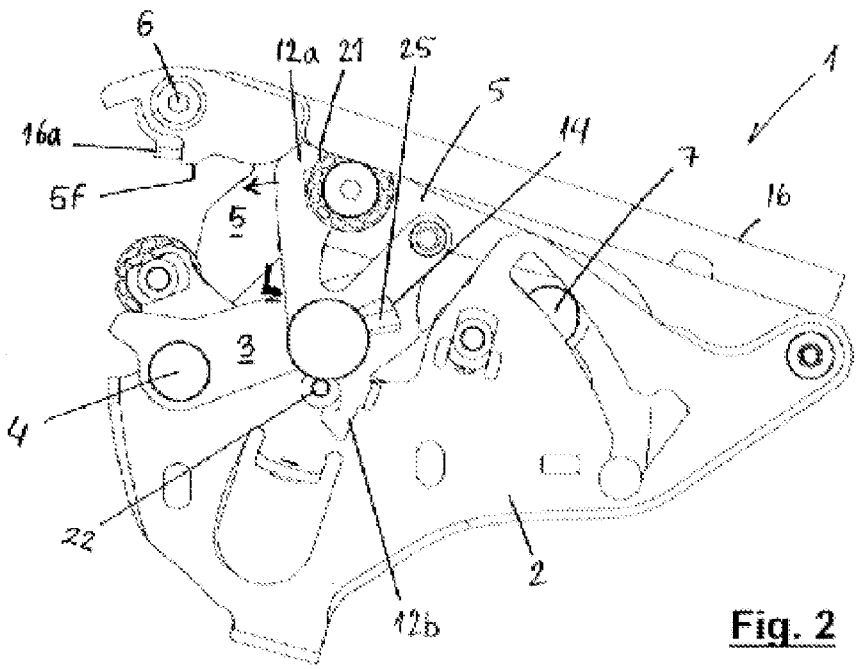
FIGS. 2 and 3 are a sequence illustrating the same hinge device of FIG. 1 when it actively responds to hitting a pedestrian and changes from the initial compact position to the extended position.
Figure 6:
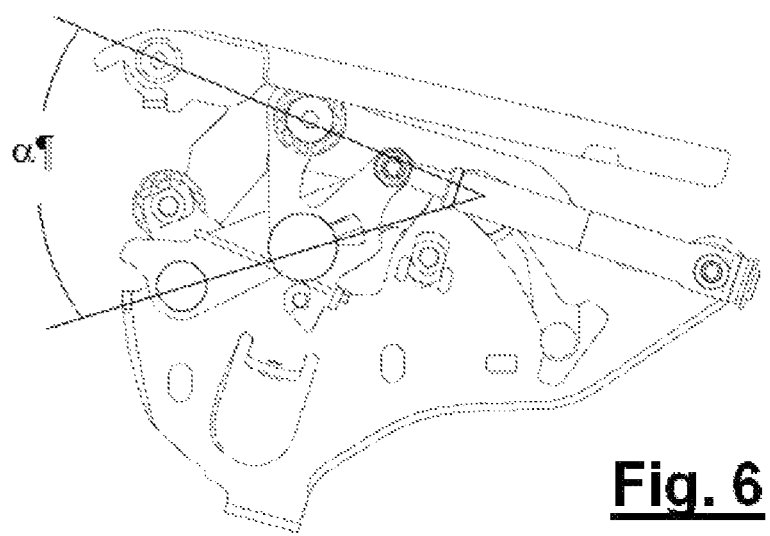
FIGS. 6 and 7 show the angle α formed by the lower and upper bars in the compact and extended positions of said device, respectively.
Figure 7:
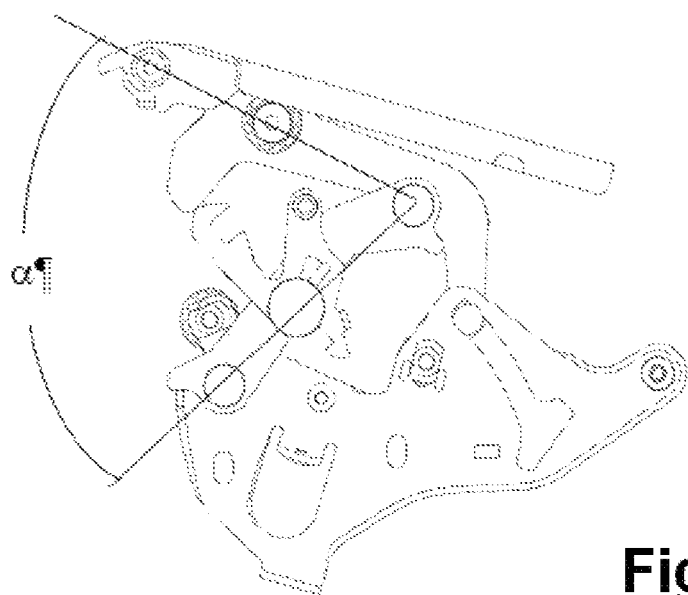

Based on the position illustrated in FIG. 1, in the event of hitting a pedestrian and the conditions necessary for generating an electrical signal for actuating the actuator 9 being complied with, the latter will extend immediately such that the plunger 24 will exert a thrust on the lever 11 triggering the lifting of the rotating shaft 6 of the hood 27 in two phases. In a first phase, the lever 11 will rotate changing from adopting a retaining position R to adopting a release position L, illustrated in FIG. 2, in which the function of the retaining mechanism 8 is disabled because the hooks of the lever 11 do not engage the support body 2 and the upper bar 5, therefore not preventing the relative movement between the lower bar 3 and upper bar 5 or the rotation of the lower bar 3 with respect to the support body 2. In a second phase, the rotation of the lever 11 will cause the rotation of the lower bar 3 in the counterclockwise direction due to contact between the groove 13 and the protuberance 25 of the lower mentioned bar 3, causing the lifting of the intermediate articulation 7 and the movement of the upper bar 5 in a manner that increases the angle α formed by the lower bar 3 and upper bar 5, all this until attaining the extended position illustrated in FIG. 3. FIGS. 6 and 7 show the variation of the angle α as the device changes from a compact position to an extended position.

The runner 14 preferably comprises a main section 14c defining a path for the element 15 when the device 1 changes from a compact position to an extended position, and vice versa, diverging from the path that this element 15 would follow in the event of following a movement with constant radius with respect to the lower articulation 4.

In the depicted embodiment, the support body 2 is provided with a runner 14 along which there slides an element 15 formed in or attached to an extension 5a of the upper bar 5, intended for driving, in cooperation with the lower bar 3, the upper bar 5 by means of the intermediate articulation 7 when the device 1 changes from an extended shape to a compact shape. The instantaneous orientation of the upper bar 5 will be determined by the position adopted by the intermediate articulation 7 at that very moment and by the shape of the runner 14 in that section guiding the element 15.

This runner 14 performs a notable function when the device 1 is manually manipulated so that it again adopts a shape similar or equal to the compact shape from an extended position. During this operation, the orientation of the upper bar 5 may be conditioned by the force exerted by the pneumatic pistons on the hood in vehicles in which such pneumatic pistons are provided to assist opening the hood.

The device 1 is prepared so that the resistance arm 11b of the lever 11 again secures the upper bar 5, the means 12a for holding the upper bar 5 cooperating with the key 21 provided in said upper bar 5. Simultaneously, the means 12b for holding the support body 2 will engage the key 22 integral with the mentioned support body 2.

Figure 3:
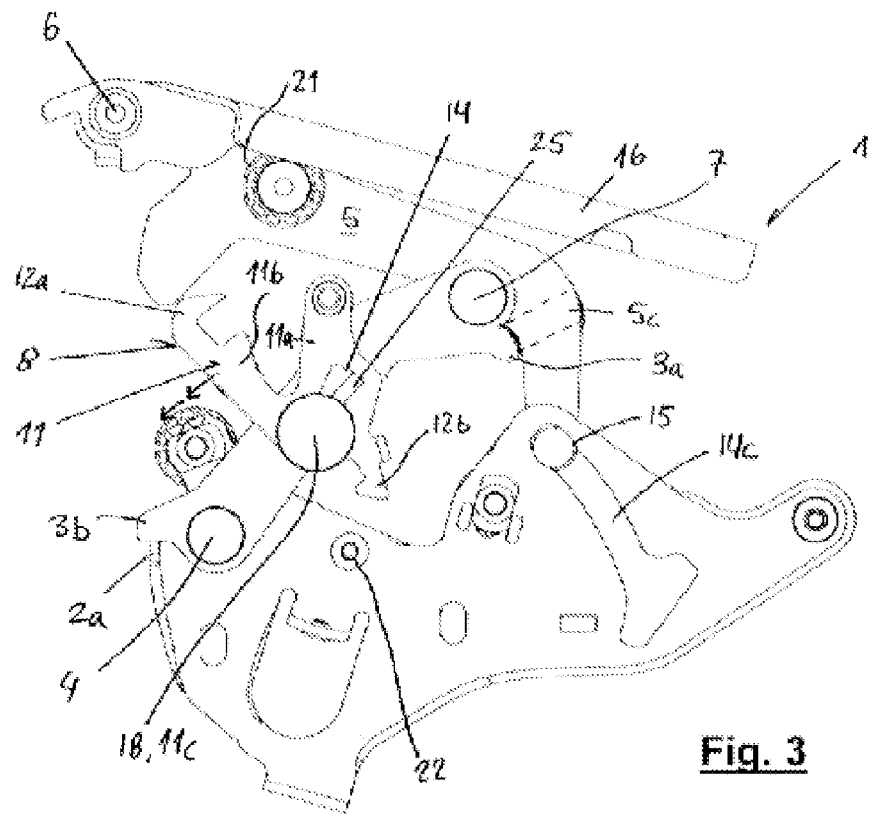

The device 1 is also prepared for limiting the movement of the articulated structure formed by the lower and upper bars 3, 5 so that the movement of said bars stops when the device attains the extended shape of FIG. 3.

In the example, the lower bar 3 and the upper bar 5 are configured about the intermediate articulated attachment 7 to prevent the angle α from exceeding a predetermined maximum value due to contact between the bars when the device 1 attains an extended shape. This configuration can be, for example, in the form of an extension 3a (see FIG. 3) in the lower bar 3 abutting with a crease 5c or rib formed in the upper bar 5 in the plane of movement of the lower bar 3.

In combination with or in replacement of the foregoing, the lower bar 3 and the support body 2 are configured about the lower articulation 4 to stop the rotation of the lower bar 3 due to contact between both when the device 1 changes from a compact shape to adopt an extended shape. This configuration can be, for example, in the form of an extension 3b in the lower bar 3 abutting with a protrusion or flange 2a formed in the support body 2 projecting in a direction normal to the plane of movement of the lower bar 3.

The device 1 is also prepared to prevent under these circumstances the rotation of the hood 27 in the direction for closing. In the variant of the device 1 depicted in FIGS. 1 to 10, the support bar 16 for supporting the hood, rotatably mounted about the rotating shaft 6, and the upper bar 5 are configured to prevent the rotation of the support bar 16 for supporting the hood due to contact between both in the direction for closing the hood 27.

More specifically, the support bar 16 for supporting the hood articulated in the rotating shaft 6 to which the hood is fixed comprises an extension 16a abutting with a flange 5f (see FIG. 2) of the upper bar 5 projecting in a direction essentially normal to the plane of movement of the upper bar 5 to prevent the rotation of the attachment bar 16 and therefore of the hood in the direction for closing.

As detailed below, the device 1 is prepared for adopting at least two different collapsed shapes A and B, shown in FIGS. 4 and 5, respectively, based on the situation illustrated in FIG. 1 without the actuator 9 moving the retaining mechanism 8 to the release position L when a force with a downward vertical component F caused by hitting a pedestrian, for example, is transmitted to the hood and is then transmitted to the upper bar 6 of the device.

Figure 4:
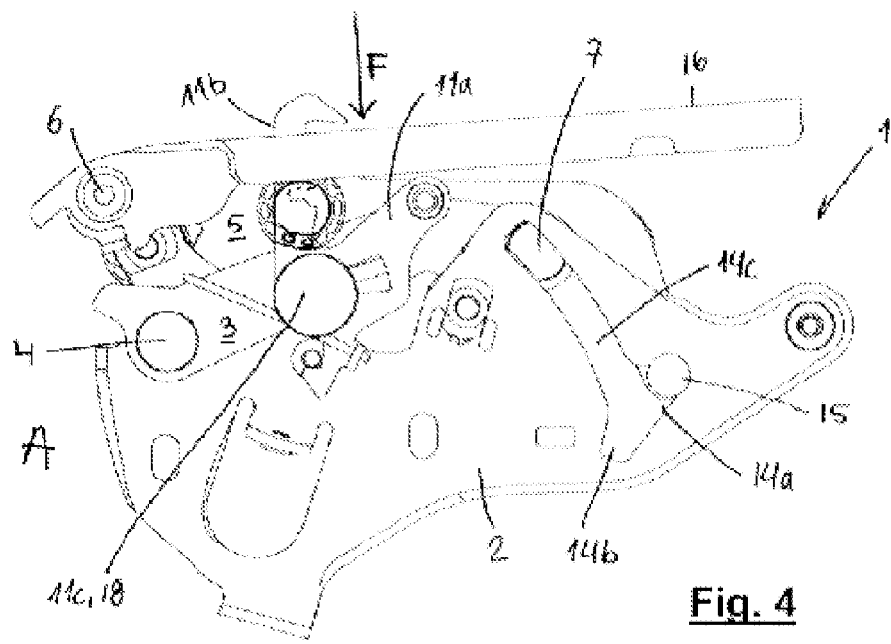
FIG. 4 shows the same hinge device of FIG. 1 in a first collapsed position as a passive response to hitting a pedestrian.

The collapsed position A of FIG. 4 is attained due to the rotation of the upper bar 5 about the intermediate articulation 7 when the force with a vertical component F strikes the hood in an area closer to the rotating shaft 6 instead of the vertical projection of the intermediate articulation 7.

The device 1 is capable of adopting collapsed shape A by overcoming the reaction force of the retaining mechanism 8, in this case consisting of the lever 11, opposing the rotation of the upper bar 6 about the intermediate articulated attachment 7 in the angle α-reducing direction.

More specifically, in one embodiment the device 1 is capable of adopting collapsed shape A due to the deformation of the resistance arm 11b of the lever 11 or due to the breaking of the key 21.

In another embodiment, the device 1 is capable of adopting collapsed shape A due to the breaking or movement of the attachment 18 between the lever 11 and the lower bar 3. The movement can be due to the deformation or breaking of the bar 3; to the deformation or breaking of the attachment 18 or to a combination of both.

It must be noted that the runner 14 is provided with a first end branch 14a in which the element 15 is introduced when the device 1 tends towards adopting collapsed shape A. This first branch 14a leaves a space so that the upper bar 5 can rotate unhindered about the intermediate articulation 7.

Figure 5:
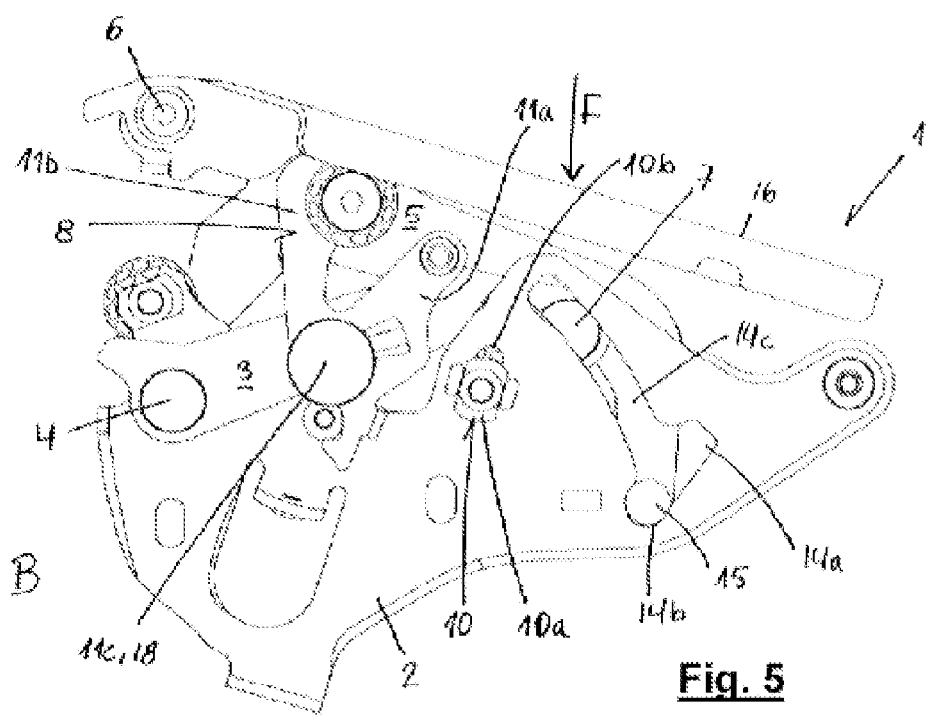
FIG. 5 shows the same hinge device of FIG. 1 in a second collapsed position as a passive response to hitting a pedestrian.

The collapsed position B of FIG. 5 is attained due to the rotation of the lower bar 3 about the lower articulation 4 when the force with a vertical component F strikes the hood in an area closer to the vertical projection of the intermediate articulation 7 instead of the rotating shaft 6.

The device 1 is capable of adopting collapsed shape B by overcoming the reaction force of the abutment means 10 opposing the rotation of the lower bar 3 about the lower articulated attachment 4.

In one embodiment, the abutment means 10 are formed by a support body 10a on which the lower bar 3 rests. This support body 10a will give way when the force exerted by the lower bar 3 exceeds a predetermined value threshold.

In one variant, the support body 10a is mounted such that it can slide with respect to the support body 2 and is prepared so that the reaction force opposing the downward rotation, i.e., in the clockwise direction in FIG. 4, of the lower bar 3 can be regulated at a pre-established value.

In the example, the support body 10a is mounted such that it can slide in a guide element 10b, which can be a groove formed in the support body 2, and is located between the lower articulation 4 and the intermediate articulation 7 connecting the mentioned lower bar with the support body 2 and the upper bar 5, respectively. Other locations for this support body 10a are possible.

According to this variant, the support body 10a can be tightened against the guide element 10b or, where appropriate, expand against the edges of the groove forming this guide element 10b, for example by applying a specific tightening torque thereto.

FIG. 5 shows how the support body 10a is moved with respect to the position that it adopts in FIG. 1. It is also observed that the means 12b for holding the support body 2 provided in the lever 11 are moved downwards with respect to the position that they adopt in FIG. 1.

In another variant, it is envisaged that the support body 10a is rigid enough so that a part or a component of the lower bar 3 resting on the support body 10a deforms, breaks or gives way, allowing the rotation of this lower bar 3 in the clockwise direction, always in reference to the drawings.

It must be noted that the runner 14 is provided with a second end branch 14b in which the element 15 is introduced when the device 1 tends towards adopting collapsed shape B. This first branch 14a leaves a space so that the element 15 of the end 5a of the upper bar 5 can rotate unhindered about the lower articulation 4. The second branch 14b of the runner 14 preferably defines a path for the element 15 with constant radius with respect to the lower articulation 4.

Logically, the device 1 is capable of adopting a third non-depicted collapsed shape resulting from a simultaneous rotational movement of the lower bar 3 in the clockwise direction about the lower articulation 4 and of the upper bar 5 in the counterclockwise direction about the intermediate articulation 7.

Figure 8:
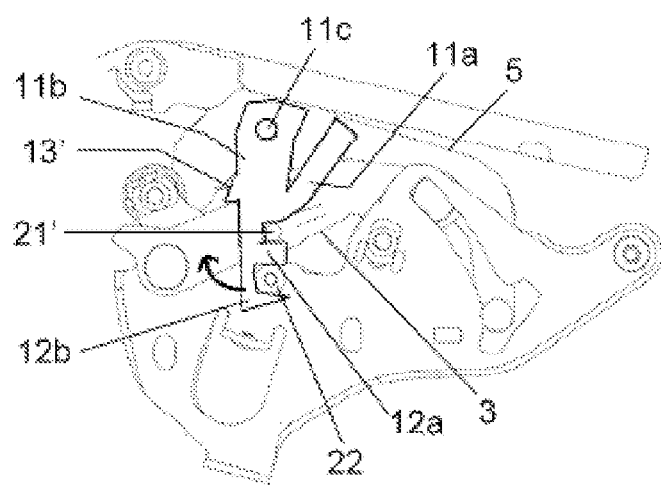
FIGS. 8 to 10 schematically show alternative constructive shapes of a hinge device according to the invention.
Figure 9:
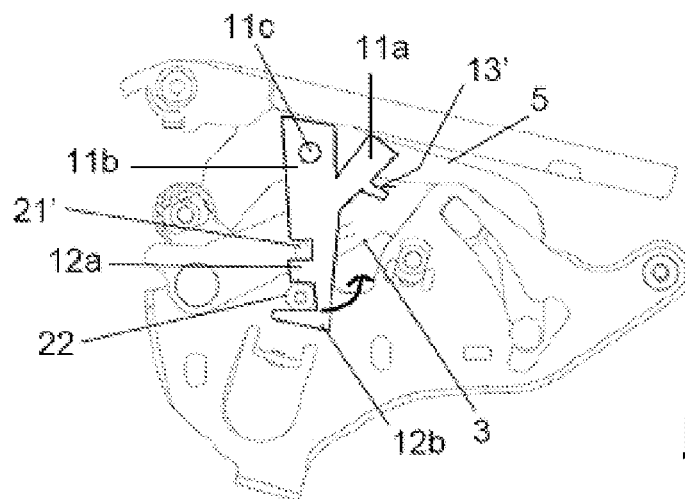
Figure 10:
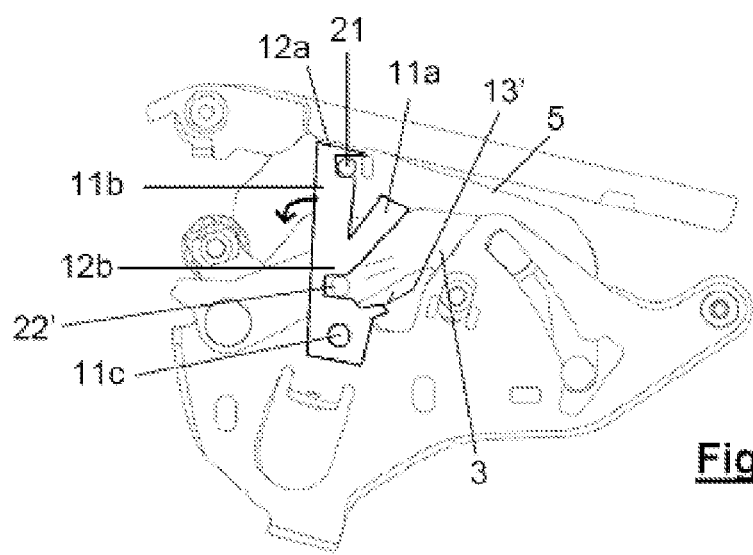

FIGS. 8 to 10 show alternative embodiments for the device 1 and specifically for the retaining mechanism 8. In these embodiments, the retaining mechanism 8 still comprises a lever 11 in which two arms 11a and 11b and a fulcrum 11c are distinguished.

Unlike the embodiment of FIGS. 1 to 7 in which the lever 11 is rotatably mounted in an attachment 18 with the lower bar 3, in the embodiments of FIGS. 8 and 9, the fulcrum 11c of the lever 11 is arranged on the upper bar 5. In the embodiment of FIG. 10, the fulcrum 11c of the lever 11 is arranged on the support body 2.

In all the cases, the arm 11a is intended for receiving the thrust of the actuator (not depicted in these FIGS. 8 to 10) which will be connected to the arm 11a to cause in each case the rotation of the lever 11 in the direction indicated by the corresponding arrow in FIGS. 8 to 10.

Through a thrust element 13' integral with the lever 11, in the variants of FIGS. 8 and 9 the rotation of said lever 11 will cause the thrust of the upper bar 5 to arrange the device 1, depicted in a compact shape, in a deployed position; however, in the variant of FIG. 10, the rotation of said lever 11 will cause the thrust of the lower bar 3 to arrange the device 1 in the mentioned deployed position.

In the embodiments of FIGS. 8 and 9, the lever 11 attached with the capacity for rotating the upper bar 5 maintains the relative position between the lower and upper bars 3 and 5 through the means 12a for holding the key 21' integral with the lower bar 3. In turn, the assembly of the lower and upper bars 3 and 5 remains fixed with respect to the support body 2 through the means 12b for holding the key 22 integral with the mentioned support body 2.

The device 1 can attain a collapsed position similar to position A depicted in FIG. 4 due to the deformation, breaking or movement of the attachment between the fulcrum 11c of the lever 11 and the upper bar 5, due to the deformation or breaking of the arm 11b, due to the deformation, breaking or movement of the key 21', or due to a combination of the mentioned solutions.

In the embodiment of FIG. 10, the lever 11 attached with capacity for rotating the support body 2 maintains the relative position between the lower and upper bars 3 and 5 through the means 12a for holding the key 21 integral with the upper bar 5 and the means 12b for holding the key 22' integral with the lower bar 3.

The device 1 according to FIG. 10 can attain a collapsed position similar to position A depicted in FIG. 4 due to the deformation or breaking of the arm 11b, due to the deformation, breaking or movement of any one of or all the keys 21 and 22', or due to a combination of the mentioned solutions.

The invention claimed is:

1. A hinge device for the articulated attachment of a hood to a vehicle chassis, the device comprising a support body intended for being firmly secured to the vehicle chassis; a lower bar rotatably attached to the support body through a lower articulation; an upper bar supporting the rotating shaft about which the hood rotates in normal conditions of use which is rotatably attached to the lower bar through an intermediate articulation; a retaining mechanism which, in a retaining position, maintains the angle α formed by the lower and upper bars and fastens the assembly formed by said bars to the support body such that the device adopts a compact shape; and an actuator capable of moving the retaining mechanism to a release position, disabling the function of the mentioned retaining mechanism and causing the angle formed by the lower and upper bars to increase and the device to accordingly adopt an extended shape, lifting the rotating shaft of the hood, characterized in that the device is prepared for adopting at least two different collapsed shapes without the actuator moving the retaining mechanism to its release position, one collapsed shape due to the rotation of the upper bar about the intermediate articulation and the other collapsed shaped due to the rotation of the lower bar about the lower articulation depending on the location of the resultant of a vertical downward force transmitted to the upper bar of the device, caused by hitting a pedestrian.

2. The device according to claim 1, characterized in that the device is capable of adopting collapsed shape by overcoming the reaction force of abutment means opposing the rotation of the lower bar about the lower articulated attachment, or due to the movement, deformation or breaking of a part or component of the lower bar itself resting on the mentioned abutment means.

3. The device according to claim 1, characterized in that the abutment means are prepared so that the reaction force opposing the rotation of the lower bar can be regulated at a pre-established value.

4. The device according to claim 1, characterized in that the device is capable of adopting collapsed shape by overcoming the reaction force of the retaining mechanism opposing the rotation of the upper bar about the intermediate articulated attachment in the angle $\alpha$-reducing direction, or due to the movement, deformation or breaking of a part or component of the upper bar, the lower bar or the support body that is in contact with the retaining mechanism in its retaining position.

5. The device according to claim 1, characterized in that the device is capable of adopting collapsed shape due to the deformation of a component or part of the retaining mechanism maintaining the angle $\alpha$ formed by the lower and upper bars.

6. The device according to claim 1, characterized in that it is capable of adopting a third collapsed shape resulting from a compound motion due to the rotation of the lower bar about the lower articulation and of the upper bar about the intermediate articulation.

7. The device according to claim 1, characterized in that the retaining mechanism is formed by a bell crank lever the fulcrum of which is rotatably attached to the lower bar in an attachment arranged between the lower articulation and the intermediate articulation connecting it with the support body and the upper bar, respectively, the effort arm of the lever being connected to the actuator and the resistance arm being provided with means for holding the upper bar.

8. The device according to claim 1, characterized in that the device is capable of adopting collapsed shape due to the breaking or movement of the attachment between the lever and the lower bar.

9. The device according to claim 7, characterized in that the effort arm of the lever is provided with a groove in which a protuberance integral with the lower bar is housed.

10. The device according to claim 7, characterized in that the lever is provided with auxiliary means for holding the support body with play.

11. The device according to claim 1, characterized in that the retaining mechanism is formed by a lever the fulcrum of which is rotatably attached to the upper bar, with a part or arm connected to the actuator and with a part or arm provided with means for holding the lower bar and also preferably the support body.

12. The device according to claim 1, characterized in that the retaining mechanism is formed by a lever the fulcrum of which is rotatably attached to the support body, with a part or arm connected to the actuator and with a part or arm provided with means for holding the lower bar and the upper bar.

13. The device according to claim 1, characterized in that the support body is provided with a runner along which there slides an element formed in or attached to an extension of the upper bar driving said upper bar when the device changes from a compact shape to an extended shape and vice versa.

14. The device according to claim 1, characterized in that the runner is provided with a first end branch in which the element is introduced when the device tends towards adopting collapsed shape.

15. The device according to claim 13, characterized in that the runner is provided with a second end branch in which the element is introduced when the device tends towards adopting collapsed shape.

16. The device according to claim 1, characterized in that the lower bar, the upper bar or both are configured about the intermediate articulated attachment to prevent, the angle $\alpha$ from exceeding a predetermined maximum value due to contact between the bars when the device attains an extended shape.

17. The device according to claim 1, characterized in that the lower bar and the support body are configured about the lower articulation to stop rotation of the lower bar due to contact between both when the device changes from a compact shape to adopt an extended shape.

18. The device according to claim 1, characterized in that it comprises a support bar for supporting the hood rotatably mounted about the rotating shaft, the support bar for supporting the hood and the upper bar being configured to prevent rotation of the support bar for supporting the hood in the direction for closing the hood due to contact between both.

* * * * *